United States Patent [19]
Yamada et al.

[11] 3,716,176
[45] Feb. 13, 1973

[54] METHOD FOR CUTTING GLASS SHEETS

[75] Inventors: Tunehiko Yamada, Osaka; Seiji Egami, Nara; Harumi Sasatani, Osaka; Hideaki Matsuoka, Osaka; Saburo Emoto, Osaka; Kunio Okamura, Osaka, all of Japan

[73] Assignee: Central Glass Company, Ltd., Yamaguchi-ken, Japan

[22] Filed: May 3, 1971

[21] Appl. No.: 139,795

Related U.S. Application Data

[60] Division of Ser. No. 22,126, March 31, 1970, abandoned, which is a continuation of Ser. No. 680,818, Nov. 6, 1967, abandoned.

[30] Foreign Application Priority Data

Feb. 8, 1967     Japan ................................. 42/7657

[52] U.S. Cl. ........................ 225/96.5, 83/11, 83/12, 83/156, 83/256, 225/2
[51] Int. Cl. ............................ B26f 3/00, B26d 3/08

[58] Field of Search ......... 225/2, 96.5, 96; 83/11, 12, 83/256, 404, 436, 156

[56] References Cited

UNITED STATES PATENTS

| | | | |
|---|---|---|---|
| 2,948,991 | 8/1960 | Walters et al. | 225/96.5 |
| 3,151,794 | 10/1964 | Brand | 225/96.5 |
| 3,279,664 | 10/1966 | Lynch | 225/96.5 |
| 3,286,893 | 11/1966 | Zellers, Jr. | 225/2 |

*Primary Examiner*—Frank T. Yost
*Attorney*—Woodhams, Blanchard & Flynn

[57] ABSTRACT

A method for cutting glass sheets, comprising the steps of producing breaking lines longitudinally of and into a face of a glass sheet moving horizontally after being cut from a continuous ribbon of glass transversely thereof into sheets of a predetermined size by a known method, changing the position of said glass sheet relative to the direction of its movement, snapping the glass sheet apart at the breaking lines, and washing and drying the glass sheets thus severed.

7 Claims, 4 Drawing Figures

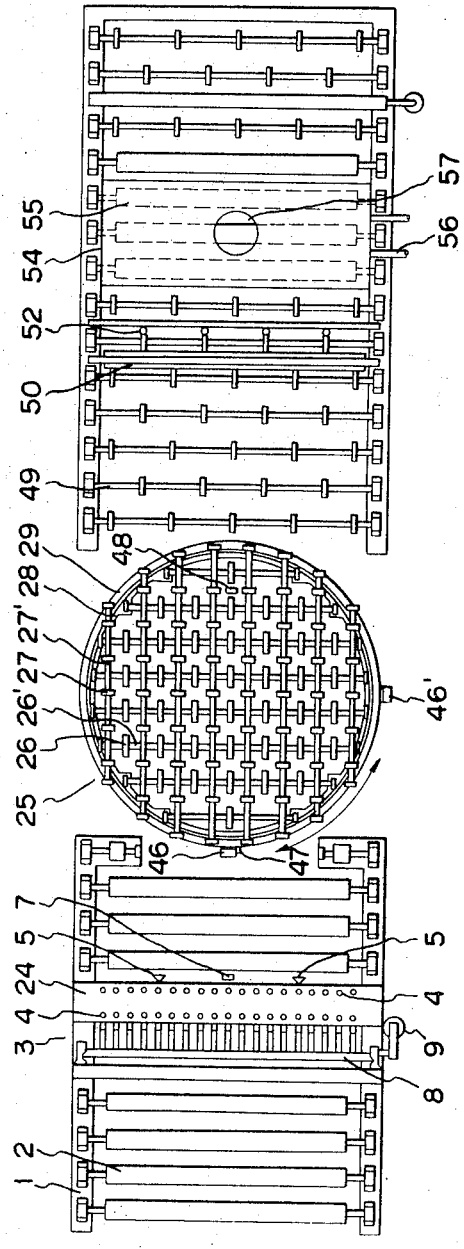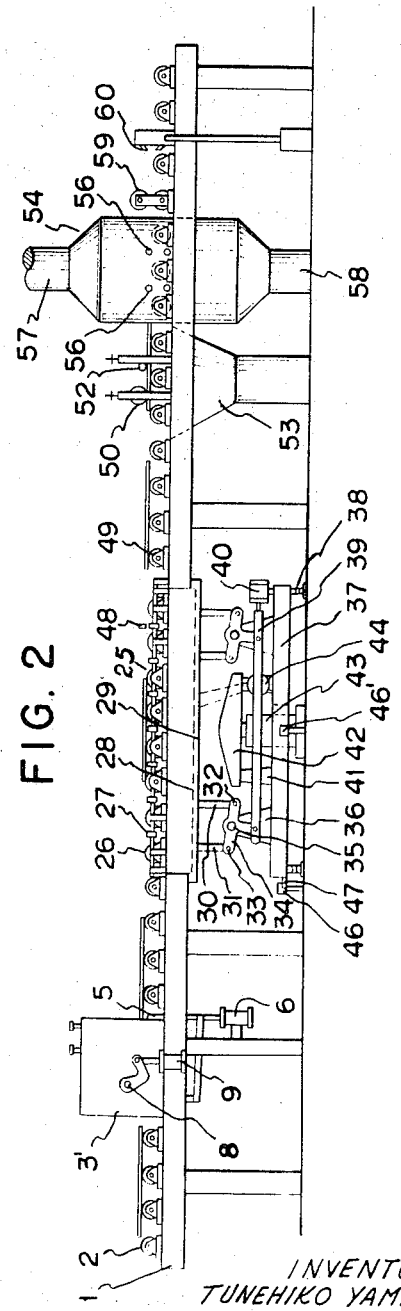
INVENTORS
TUNEHIKO YAMADA
SEIJI EGAMI
HARUMI SASATANI
HIDEAKI MATSUOKA
SABURO EMOTO
KUNIO OKAMURA
BY Woodhams, Blanchard & Flynn
ATTORNEYS INVENTORS
TUNEHIKO YAMADA
SEIJI EGAMI
HARUMI SASATANI
HIDEAKI MATSUOKA
SABURO EMOTO
KUNIO OKAMURA
BY Woodhams, Blanchard and Flynn
ATTORNEYS

METHOD FOR CUTTING GLASS SHEETS

CROSS REFERENCE TO RELATED APPLICATION

This application is a division of our copending application Ser. No. 22,126, filed Mar. 31, 1970, now abandoned, which in turn is a continuation of Ser. No. 680,818, filed Nov. 6, 1967, now abandoned.

BACKGROUND OF THE INVENTION

1. Field of the Invention

The present invention relates to a method for cutting glass sheets which have been already cut into a desired predetermined size transversely of a continuous ribbon of glass during the glass sheet manufacturing process, and more particularly to a method for cutting these individual glass sheets in a direction perpendicular to the longitudinal edge line of said glass sheet, thereafter washing and drying them for being used as commercial goods.

2. Description of the Prior Art

Glass sheet manufacturing processes of the prior art include a number of steps which rely on manual operations. Such manual operations were often the cause for the occurrence of casual breakage or chipping of glass sheets during the cutting process, exposing the operators to unforeseen dangers of sustaining injuries, and furthermore, the finished glass sheets tended to lack uniformity in size. In order to obtain finished glass sheets of uniform size with a good yield, the operators were required to receive a good deal of training to acquire highly advanced techniques, and moreover, there was a need for a large labor force. To eliminate these inconveniences and disadvantages encountered heretofore in the glass sheet manufacturing field, there have been proposed various types of glass sheet cutting apparatuses capable of performing continuous operations automatically. However, these glass sheet cutting apparatuses of the prior art invariably had complicated mechanisms and accordingly they were expansiva. Moreover, they were of such inconvenience that the control and the maintenance of established manufacturing conditions was difficult. The result was that either it was impossible to cut glass sheets precisely into correct desired size, or it was difficult to expect the prevention of a reduction in the yield.

It is, therefore, the object of the present invention to eliminate the foregoing shortcomings and inconveniences of the prior art by automatizing the secondary cutting process which is performed on individual glass sheets already prepared by cutting a continuous ribbon of glass transversely thereof as it is drawn up from molten glass. More specifically, the present invention relates to a method for automatically cutting these already prepared individual glass sheets by the use of an apparatus which comprises, in combination, a unit for producing, in the direction of movement of the glass sheet, namely, longitudinally, breaking lines into the face of the glass sheet already prepared in a predetermined size by cutting a continuous ribbon of glass transversely thereof and being conveyed in a horizontal position; a position altering unit for changing the position of the breaking line bearing glass sheet by turning the glass sheet horizontally through an angle of 90° relative to the direction of its movement so as to facilitate the subsequent snapping of said glass sheet at the breaking lines produced in the face; a snapping unit for snapping the glass sheet apart at the breaking lines already formed in the face of said glass sheet by said longitudinal breaking line producing unit; a washing and drying unit for cleaning the sheet glass severed by said snapping unit into required size; and conveying units comprising conveyor rollers for transferring the glass sheets between the aforesaid respective units. By automatizing this secondary cutting process according to the present invention as has been described, there are provided the following advantages and conveniences that the overall operation completely eliminates the assistance of operators or the use of manual procedures, that the simplified mechanism of the apparatus of the present invention which insures accurate operation makes the maintenance and control of the established manufacturing conditions quite easy, and that the finished glass sheets do not bear any injury which could be caused from manual handling during the cutting process and moreover the glass sheets are cut into accurate size, which enhances the yield as well as the quality of the finished glass sheets.

BRIEF DESCRIPTION OF THE DRAWING

FIG. 1 is a plan view, showing an example of the apparatus for use in putting the present invention into practice;

FIG. 2 is a side elevation of the apparatus of FIG. 1;

DESCRIPTION OF THE PREFERRED EMBODIMENTS

Figure 3:
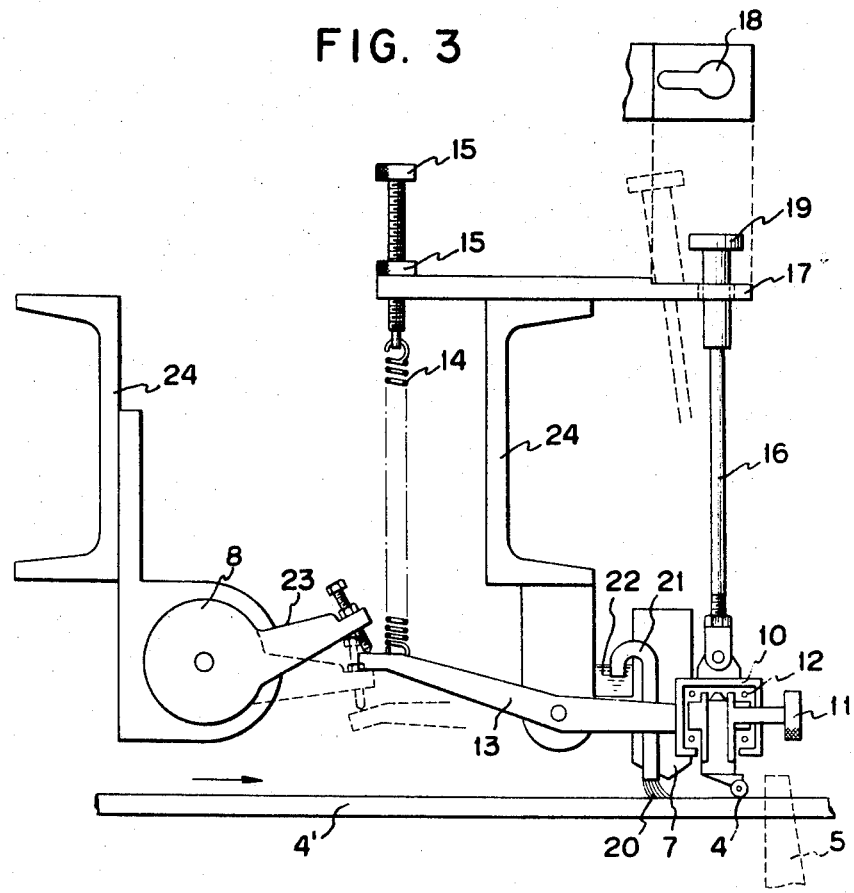
FIG. 3 is a side elevational view, in an enlarged scale, showing the mechanism of the unit for producing longitudinal breaking lines at predetermined intervals into the face of a glass sheet.

Referring now to FIGS. 1 and 2 of the drawing, reference numeral 1 represents a base frame of the cutting apparatus of the present invention, and numeral 2 represents a conveyor roller. A continuous ribbon of glass vertically drawn up from the molten glass according to Fourcault method of Pittsburgh method is transversely cut into a predetermined size by a known cutting means (not shown) and is then laid in horizontal position on conveyor rollers 2 by a known laying machine (not shown) and is transferred on the conveyor rollers. Numeral 3 represents a unit for cutting longitudinal breaking lines on a face of the glass sheet horizontally laid on the conveyor rollers, which comprises a housing 3' for holding a multitude of cutting tools 4 which are disposed at two inch intervals transversely of the direction of movement of the glass sheet which is carried on and transferred by the conveyor rollers 2, stoppers 5 and 5 for suspending the movement of the glass sheet and for receiving the forward edge of the moving sheet of glass, an air cylinder 6 for driving said stoppers, a photoelectric switch 7 adapted to detect the position of the glass sheet, a shaft 8 for pressing down cutter levers which are adapted to cause the vertical movement of the cutting tools, and another air cylinder 9 for driving said shaft 8. FIG. 3 shows the mechanism for one of the cutting tools of the unit for cutting longitudinal breaking lines. In FIG. 3, reference numeral 4' represents a sheet of glass. Numeral 4 represents a cutting tool. Numeral 10 represents a cutting tool holder. Numeral 11 represents an adjusting screw, and numeral 12 represents a ball bearing. The cutting tool 4 is rotatably attached to the holder 10. Numeral 13 represents a cutter lever. Numeral 14 represents a coil spring. Numeral 15 represents a screw for adjusting the expansion of said coil spring. Numeral 16 represents a suspension rod. Numeral 17 represents a bracket. Numeral 18 represents a slot for anchoring said suspension rod therein. Numeral 19 represents a knob of the suspension rod. Numeral 20 represents a wick for supplying lubricating oil. Numeral 21 represents a lubricating oil supply pipe. Numeral 22 represents a lubricating oil reservoir, and numeral 23 represents a fitting for pressing down the cutter lever. The cutter lever pressing down fittings 23 are fixed to the cutter lever pressing down shaft 8. Numeral 24 represents a rack for carrying the longitudinal breaking line producing unit and is provided on the conveyor frame so as to straddle the conveyor.

Description will hereunder be directed to the behavior of the unit for producing longitudinal breaking lines by referring to FIGS. 1, 2 and 3. Among a plurality of cutting tools, those which are not used in producing the breaking lines are retained, in their non-cutting position, in the anchoring slot 18 and are held therein by the urging force of the coil spring 14 when the knobs 19 of the corresponding rods are lifted up to the position indicated by the broken line. The suspension rods 16 of the cutting tools to be participated in the production of breaking lines are adapted to freely slide through the anchoring slots 18. The pressing down fittings 23 are so arranged that in their state of not participating in the production of longitudinal breaking lines, they are retained in their lowered positions as indicated by the broken line, in which state of the fittings 23, all of the cutting tools are in their up-lifted positions not contacting the glass sheet carried on the conveyor rollers and also that, when the pressing down fittings are lifted, only those cutting tools which are to participate in the formation of breaking lines are lowered so as to be brought into contact with the glass sheet located beneath them. While it is necessary that the longitudinal breaking lines which are cut into the face of the glass sheet transferred on the roller conveyor 2 be formed exactly at right angle relative to the forward edge of said glass sheet, it frequently occurred in the prior art that the forward edge line of the moving sheet of glass tended to deviate slightly from the right angle relative to the direction of the movement of said glass sheet. If longitudinal breaking lines are cut into the face of a glass sheet whose forward edge line is not located at right angle with the direction in which the glass sheet is conveyed, then the formed breaking lines will accordingly form an angle which is not 90° relative to the forward edge line of the glass sheet. In the apparatus embodying the present invention, the line which is formed by drawing a line between the two stoppers 5 and 5 is established to make the right angle with the direction in which the glass sheet is conveyed. Therefore, by causing the glass sheet which is transferred on the conveyor rollers to engage at its forward edge with both of these two stoppers 5 and 5, this engaging forward edge line of the glass sheet can be positioned exactly at right angle relative to the direction in which the glass sheet is conveyed, and thus, the formation of accurate longitudinal breaking lines is materialized. The moment that the forward edge of the moving glass sheet is brought into contact with the two stoppers 5 and 5, the photoelectric switch 7 is actuated to detect the position of the forward edge line of this glass sheet and at the same time it produces an electric signal to actuate the air cylinder 9 which, in turn, rotates the shaft 8 counterclockwise so that the pressing down fitting 23 is lifted up to the position indicated by the broken line. As a result, only those cutting tools which have been set for cutting breaking lines are lowered and brought into contact with the face of the glass sheet located beneath them. Those cutting tools not participating in the production of breaking lines are retained in the anchoring slots 18. Simultaneously with the foregoing operation, said another air cylinder 6 is actuated so that the stoppers 5 and 5 are caused to submerge to allow the glass sheet to resume its movement which is effected by the conveyor rollers. As the glass sheet resumes its movement on the conveyor rollers, breaking lines are cut into the face of the running glass sheet. The lubricating oil supply pipe 21 contains therein a wick 20 made of fibers and supplies lubricating oil, by virtue of the capillary action of this wick, from the oil reservoir 22 through the oil supply wick 20 to the face of the glass sheet to enhance the efficiency of the subsequent snapping-apart of the glass sheet at the breaking lines formed thereon. When the rear edge of the glass sheet has passed the position at which the photoelectric switch is located, the latter immediately produces an electric signal to cause both the stoppers and the cutting tools to be lifted upwards. Then, with the arrival of a next glass sheet, the foregoing operation is repeated automatically to produce breaking lines on this newly arriving glass sheet.

The cutting tools of the longitudinal breaking line producing unit incorporated in the apparatus of the present invention are disposed exactly at 2 inch intervals in view of the commercial practice that various glass sheets placed on the markets are dimensionally based on 2 inch unit. By actuating the required cutting tools from among a row of cutting tools, the glass sheet is cut into required size, and moreover, precise dimension is insured. Furthermore, the provision of the stoppers permits one to unmistakably obtain precise right angle between the edge line of the glass sheet and the direction of its movement for each glass sheet to be conveyed. Longitudinal breaking line producing mechanism of the prior art, however, employed, as the driving source for the uplifting and the lowering of the cutting tools, a servo motor, a magnetic or air cylinder for each one of the cutting tools. When compared with such prior mechanism, the apparatus of the present invention bears a number of advantages over the prior art, such as the simplified structure of the apparatus, the positive and reliable accurate behavior of the apparatus and the low manufacturing cost.

The glass sheet after completion of the formation of breaking lines is now ready for being subjected to the snapping step. If, however, the apparatus is so arranged that the glass sheet which bears the longitudinal breaking lines thereon is conveyed further in this position, that is, with the breaking lines extending in the direction of the movement of the glass sheet, to a snapping unit, not only the snapping unit requires a very complicated mechanism for effecting sound cutting along the breaking lines, but also there arises a disadvantage that the cut plane of the glass sheet is chipped due to the contact of the adjacent edges of the severed glass sheets. This problem has been successfully solved according to the present invention by the use of the position-altering means which is designed so as to change the position of the glass sheet which has been conveyed and located on the position-altering means through an angle of 90° horizontally to thereby shift the direction of the breaking lines from being in parallel with the moving direction of the glass sheet to a direction transverse to the direction of movement of the glass sheet, and also by feeding this glass sheet which has now a different position onto a tilted snapper of the snapping unit.

In FIGS. 1 and 2, reference numeral 25 represents generally a position altering and conveying unit which is equipped with a plurality of conveyor rollers 26 and also with a plurality of conveyor rollers 27 which are disposed perpendicular to the conveyor rollers 26. Accordingly, the shafts 26' of the conveyor rollers 26 are disposed perpendicular to the shafts 27' of the conveyor rollers 27. The shafts 26' are supported by the bearings provided on an inner annular supporting frame 28, while the shafts 27' are supported by the bearings provided on an outer annular supporting frame 29. Said inner annular supporting frame 28 is equipped with a downwardly extending supporting arm 30, while the outer supporting frame 29 are provided with a downwardly extending supporting arm 31. This arm 30 and the arm 31 which form a pair are supported by the opposite ends of a supporting york 34 by means of bearings 32 and 33. The supporting york 34 is supported at the center thereof on a supporting stand 36 through a bearing 35. This supporting stand 36, in turn, is fixed on a round-shaped supporting table 37. Said supporting table 37 is adapted to be rotated by means of a rail 38 laid on the floor. Said supporting stand 36 is disposed on said supporting table 37. By this arrangement, the inner and the outer annular supporting frames 28 and 29 are rotatably held in a horizontal position, respectively. The supporting york 34 has a downwardly extending arm, the lowermost end of which is rotatably coupled to a rod 39 which, in turn, is adapted to be driven sideways by an air cylinder 40. By the movement of this rod 39, the supporting arms 30 and 31 effect upward and downward movements alternatingly relative to each other. This alternate vertical movements of the supporting arms 30 and 31 cause the inner and the outer annular supporting frames 28 and 29 to make vertical movements alternatingly. By virtue of this alternate upward and downward movements of the supporting frames, the position of the glass sheet laid on the conveyor rollers is shifted. An oil-pressure rotary cylinder 43 having a rotary rod 42 is installed on the bottom floor at a position centrally of said supporting table 37. The opposite ends of the rod 42 is connected to the upper ends of supporting members 41 fixed to the face of said supporting table 37. Therefore, by driving the oil-pressure rotary cylinder 43, the supporting table 37 is rotated, and the inner and the outer annular supporting frames 28 and 29 are also rotated accordingly. The conveyor rollers 26 and 27 are driven by means of a chain, via a solenoid clutch, from a motor 44 installed on said supporting table 37. A photoelectric switch 48 for detecting the presence of a glass sheet is provided on the annular supporting frame and above the conveyor rollers 26 and 27. Also, limit switches 46 and 46' are provided on the bottom floor and outside the supporting table 37. Said limit switches are actuated by being contacted by a cam member 47 which protrudes from the lateral peripheral edge of said supporting table 37 to control the direction of rotation and the position at which said supporting table is to be stopped.

Description will next be directed to the action of the position altering and conveying unit. In the stage of operation where a glass sheet is transferred from the roller conveyor 2 into this unit, both of the conveyor rollers 26 and 27 are still in the state of being driven from the motor 44, and the direction of conveyance of the rollers 26 is in the extension of the direction of conveyance of the roller conveyor 2. In this state, the top of the periphery of the conveyor roller 26 is positioned higher than the level of the top of the periphery of the conveyor roller 27. The glass sheet which has been travelling on the conveyor rollers 2 advances further and is transferred onto the conveyor rollers 26. When the glass sheet is thus positioned centrally of the annular supporting frame, the photoelectric switch 48 is actuated and detects the forward edge of said glass sheet. It then produces an electric signal by which the magnetic clutch of the motor 44 is caused to be released so that the driving of the conveyor rollers 26 and 27 is suspended, while on the other hand the oil-pressure rotary cylinder 43 which serves to turn counterclockwise the conveyor rollers 26 on which said glass sheet is carried in the center. As the annular frames carrying the conveyor rollers are turned, the cam member 47 is brought into engagement with a limit switch 46'. By virtue of a signal produced by this limit switch, the rotation of the oil-pressure rotary cylinder is suspended, while on the other hand the air cylinder 40 is actuated to put the supporting york 34 into motion, causing the position of the top of the conveyor rollers 27 to be shifted higher than the top of the conveyor rollers 26. Simultaneously therewith, the magnetic clutch of the motor 44 is actuated to commence the driving of the conveyor rollers 27. As a result, the glass sheet is transferred, by the roller conveyor 27, onto a roller conveyor 49 in the same direction of movement as that in which the glass sheet was conveyed by the roller conveyor 2, with the position of the glass sheet now being shifted through an angle of 90° from the position in which the glass sheet was carried on the roller conveyor 2. As a result, the breaking lines of the glass sheet are now positioned transversely of the direction of movement of the glass sheet. The glass sheet which follows the first glass sheet and conveyed on the roller conveyor 2 is then delivered to the roller conveyor 27. As this glass sheet is positioned centrally thereon, its further movement is suspended by virtue of the signal of the photoelectric switch 48. At the same time, the rotation of the oil-pressure rotary cylinder causes the supporting table to make reverse or clockwise rotation, so that the cam member 47 moves through an angle of 90° and is brought into a position where the limit switch 46 senses the arrival of the cam member. As a result, the air cylinder 40 is actuated to lift the conveyor rollers 26 higher than the roller conveyors 27. In this position, the roller conveyor 26 is again driven and the glass sheet is transferred onto the roller conveyor 49. This series of behavior is repeated.

Depending on the layout of various apparatuses installed in the manufacturing factories, the altering of the direction of conveyance of glass sheets need not be limited to 90°. By changing the site at which the limit switch 46' is installed, the glass sheets can be conveyed in any desired direction, and thus, the space in the factories is effectively utilized.

The position altering and conveying unit of the present invention bears an outstanding feature that it permits the position of the glass sheet to be changed in any desired direction and that both the altering of the position and the conveyance of the glass sheet are performed rapidly and simultaneously.

Figure 4:
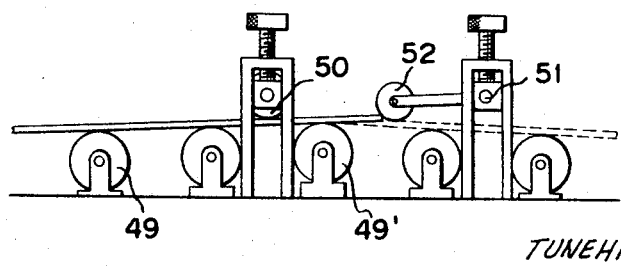
FIG. 4 is a side elevational view, in an enlarged scale, showing the essential parts of the snapping unit for severing the glass sheet having the longitudinal breaking lines.

The glass sheet which moves on the conveyor rollers 49 is then subjected to the snapping step which is performed in the snapping unit in such fashion that the glass sheet is snapped apart at the breaking lines formed in the face thereof. A multitude of conveyor rollers 49 are disposed in such manner that those rollers located farther from the delivery edge of the annular supporting frame are of gradually increasing heights than the heights of those disposed nearer the annular supporting frame, with the conveyor roller 49' being of the greatest height. The conveyor rollers disposed ahead or in the direction of advancement of the glass sheet from this roller 49' are of gradually decreasing heights. As best seen in FIG. 4, the side elevation of the group of the conveyor rollers 49 including the one 49' shows a gentle chevron-form slopes.

The snapping unit is equipped with an upper roller or suppressing roller 50 and a suppressing ring 52 which is made with a hard rubber or a plastic material. This upper roller 50 and the ring 52 are fixed in such manner that their altitudes can be adjusted relative to the level of the glass sheet conveyed thereto. Said suppressing roller 50 and said ring 52 which is adapted to be vertically shifted of its position by means of the shaft 51 are arranged for free rotation.

Description will next be made on the behavior of the snapping unit. The forward edge of the glass sheet which is conveyed by the roller conveyor 49 runs against the lower edge of the ring 52. Therefrom, the glass sheet is urged to advance further only for a very short distance while it is slightly bent upwardly. It is to be noted that the portions of the glass sheet where the breaking lines are formed have a markedly reduced mechanical strength. Accordingly, when a breaking line of the glass sheet comes into position right upon the conveyor roller 49', the glass sheet is forcibly snapped apart at this breaking line. After the rear end edge of the severed glass sheet has passed the conveyor roller 49', the conveyor rollers disposed ahead of said roller 49' are adapted to be rotated at an increased speed, and thus, the subsequent undesirable contact of the rear edge of the severed glass sheet with the forward edge of the remaining portion of the glass sheet is prevented. Reference numeral 53 represents a cullet receptacle. The unuseful cutoff portions of the glass sheet, such as the marginal or edge portions, or rejectable portions having odd dimensions, are generally of sufficiently small widths for being allowed to pass through any one of the spaces between any adjacent rollers 49 ad to drop into the cullet receptacle to be collected therein.

The snapping unit according to the present invention performs the severing operation, with the breaking lines being positioned substantially perpendicular with respect to the direction in which the glass sheet is conveyed and while the glass sheet is travelling forwardly. This arrangement of the snapping unit insures positive and reliable operation and also eliminates the contact of the adjacent cut edges of the glass sheets. Therefore, there are provided the advantages that the occurrence of chipping of the cut edges or corners of glass sheets is avoided, that the provision of any special driving means is unnecessary for performing the snapping operation, and that, accordingly, the mechanism is simplified and yet reliable operation is attained. The glass sheets thus severed are then washed and dried.

In FIGS. 1 and 2, reference numeral 54 represents washing means, wherein numeral 55 represents a conveyor roller, numeral 56 represents a hot water supply pipe, numeral 57 represents an air-exhaust pipe, and numeral 58 represents a water draining pipe. Hot water held at a temperature between 70° C and 90° C is sprayed uniformly onto both faces of the glass sheet to clean them. It is effective to shoot steam jointly with the hot water onto the faces of the glass sheet to completely remove oil therefrom. The entrance to the washing means through which a glass sheet is passed is shielded by a curtain which is made of a heat-resisting flexible material such as a rubber sheet to prevent the scattering of hot water or steam outside the washing zone. Reference numeral 59 represents a pair of water-absorbing rollers covered with a water absorbing material such as cloth or sponge. By rotating these rollers 59 while having them in appropriate pressure contact with the running glass sheet, the moisture located on the surfaces of the glass sheet is removed. Reference numeral 60 represents an air-ejecting pipe which is adapted to eject dry air currents onto the opposite faces of the glass sheet to completely dry the latter and to remove the fine foreign bodies adhering thereto and clean the faces of the glass sheet. The air which is used for this purpose is preferably heated and dried. A part of this dry, heated air is directed onto the faces of the water-absorbing rollers also, so as to dry them. The shooting of the hot water stream and the dry air current onto the faces of the glass sheet can be effectively conducted by ejecting them in a sort of counter current fashion at an angle of about 45° relative to each other streams onto each face of the glass sheet. The glass sheets thus finished can be directly packed and shipped as commercial goods.

It should be understood that the apparatus described above and illustrated in the drawing is given simply by way of example to explain the present invention, and that the present invention is not restricted thereto, but various modifications may be made by those skilled in the art without departing from the spirit of the present invention. For example, the snapping unit of the present invention may be provided before the unit of producing longitudinal breaking lines, or various combination with other known methods may also be possible.

The embodiments of the invention in which an exclusive property or privilege is claimed are defined as follows:

1. An apparatus for handling glass sheets, comprising:

conveyor means adapted to have a glass sheet substantially horizontally disposed thereon for transporting said sheet longitudinally of said conveyor means;

scoring means disposed adjacent said conveyor means for forming one or more scoring lines on said sheet as said sheet is moved longitudinally of said conveyor means, said scoring line being substantially parallel to the longitudinal direction of motion of the sheet;

sheet turning means disposed adjacent said conveyor means for receiving the scored sheet thereon and for substantially horizontally turning said sheet so that the scoring line extends at an angle relative to said direction of motion;

said turning means including a horizontally swingable table having first and second sets of conveyor rollers rotatably supported thereon, the rotational axes of said first set of rollers extending substantially at right angles to the rotational axes of said second set of rollers, and means for alternatively positioning one or the other of said sets of rollers in engagement with said scored sheet;

whereby said first set of rollers engages said sheet to transfer said sheet from said conveyor means to said table, said second set of rollers then engaging said sheet for permitting said sheet to be conveyed away from said table after said table has been swung to position the scoring line at a selected angle relative to said direction of motion; and means for breaking said scored sheet along said scoring line after said sheet has been swung to position the scoring line at a selected angle relative to said direction of motion.

2. An apparatus according to claim 1, wherein said means for alternatively positioning a selected one of said sets of conveyor rollers in engagement with said scored sheet includes shifting means for effecting alternate upward and downward movement of said first and second sets of rollers relative to one another, said shifting means including pivotal yoke means drivingly connected to said first and second sets for causing simultaneous motion of said first and second sets in opposite directions.

3. An apparatus according to claim 2, wherein said shifting means includes a pair of pivotal yoke members connected to said first and second sets for causing simultaneous and opposite upward and downward movement thereof, and a connecting link interconnected between said pair of yoke members for causing corresponding angular oscillation thereof, and means interconnected to at least one of said yoke members for causing selected angular displacement thereof.

4. An apparatus according to claim 2, wherein said turning means includes a substantially circular table having said first and second sets of conveyor rollers mounted thereon, and means connected to said circular table for causing selected rotation thereof about a substantially vertical axis.

5. An apparatus according to claim 1, further including second conveyor means disposed adjacent said turning means for receiving thereon the scored sheet after said sheet has been horizontally turned by said swingable table, said second conveyor means causing said sheet to be transported therealong with said sheet being transported in a direction substantially transverse to said scoring line, and said turning means being horizontally swingable between a first position wherein said first set of conveyor rollers is aligned with said first-mentioned conveyor means for permitting said sheet to be transferred from said first-mentioned conveyor means to said table and a second position wherein said second set of conveyor rollers is aligned with said second conveyor means for permitting said sheet to be transferred thereto from said table.

6. An apparatus according to claim 5, wherein said second conveyor means is substantially aligned with said first-mentioned conveyor means, and said swingable table is angular displaced through an angle of approximately 90° in moving between said first and second positions.

7. An apparatus according to claim 5 wherein said breaking means is disposed adjacent said second conveyor means for permitting said scored sheet to be broken along said scoring line, said breaking means including a series of the conveyor rollers of gradually increasing height in the direction of movement of the scored sheet, and a breaker roll disposed above and downstream of the last of said series of conveyor rollers for engaging the forward edge of said scored sheet and for causing snapping of said sheet at the scoring line when said scoring line is disposed substantially above the last of said series of conveyor rollers.

* * * * *